(12) United States Patent
Beier et al.

(10) Patent No.: US 11,074,310 B2
(45) Date of Patent: Jul. 27, 2021

(54) CONTENT-BASED MANAGEMENT OF LINKS TO RESOURCES

(71) Applicant: INTERNATIONAL BUSINESS MACHINES CORPORATION, Armonk, NY (US)

(72) Inventors: Felix Beier, Haigerloch (DE); Verena Henrich, Griesheim (DE); Hendrik Wagner, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 537 days.

(21) Appl. No.: 15/978,544

(22) Filed: May 14, 2018

(65) Prior Publication Data
US 2019/0347362 A1    Nov. 14, 2019

(51) Int. Cl.
*G06F 16/954* (2019.01)
*G06Q 50/00* (2012.01)
*G06F 16/951* (2019.01)

(52) U.S. Cl.
CPC .......... *G06F 16/954* (2019.01); *G06F 16/951* (2019.01); *G06Q 50/01* (2013.01)

(58) Field of Classification Search
CPC .... G06F 16/954; G06F 16/951; G06F 16/955; G06F 16/9558; G06F 16/972; G06Q 50/01
See application file for complete search history.

(56) References Cited

U.S. PATENT DOCUMENTS

| 6,012,087 A | * | 1/2000 | Freivald | G06F 16/957 709/218 |
| 7,325,045 B1 | * | 1/2008 | Manber | G06F 11/0709 709/219 |

(Continued)

FOREIGN PATENT DOCUMENTS

| CN | 102752154 B | 8/2014 |
| CN | 106682041 A | 5/2017 |

OTHER PUBLICATIONS

Soames, "5 Essential Link Checking Tools for SEOs, Bloggers and Content Editors", Sep. 11, 2014, http://www.smartinsights.com/search-engine-optimisation-seo/link-building/site-link-checking-tools/, pp. 1-13.

(Continued)

*Primary Examiner* — Robert W Beausoliel, Jr.
*Assistant Examiner* — Susan F Rayyan
(74) *Attorney, Agent, or Firm* — Richard A. Wilhelm

(57) ABSTRACT

A computer-implemented method for managing links to resources in a content management system utilizes a link analysis function, the link analysis function being adapted for receiving a link to a target resource; determining a content model of the target resource based at least on content of the target resource; and storing the content model. The method comprises generating a first target model of a first target resource by executing the link analysis function with a first link comprised by the content management system; monitoring the first target resource by generating a temporary first target model of the first target resource by repeating the execution of the link analysis function with the first link; and in response to detecting a difference between the first target model and the temporary first target model, triggering an automatic response action, which comprises storing a (Continued)

change record comprising information indicative of the detected difference.

19 Claims, 7 Drawing Sheets

(56) References Cited

U.S. PATENT DOCUMENTS

| | | | | |
|---|---|---|---|---|
| 8,996,977 | B2 | 3/2015 | Szalai et al. | |
| 2002/0065842 | A1* | 5/2002 | Takagi | G06F 16/9577 |
| | | | | 709/217 |
| 2002/0078134 | A1* | 6/2002 | Stone | G06F 16/951 |
| | | | | 709/202 |
| 2005/0021997 | A1* | 1/2005 | Beynon | G06F 16/9566 |
| | | | | 726/2 |
| 2005/0120060 | A1* | 6/2005 | Meng | G06F 16/9566 |
| 2005/0149853 | A1* | 7/2005 | Naitou | G06F 16/9558 |
| | | | | 715/206 |
| 2005/0289446 | A1* | 12/2005 | Moncsko | G06F 16/9558 |
| | | | | 715/208 |
| 2008/0263193 | A1 | 10/2008 | Chalemin et al. | |
| 2009/0125533 | A1 | 5/2009 | Calbucci | |
| 2013/0024758 | A1* | 1/2013 | Darby | G06F 16/748 |
| | | | | 715/205 |
| 2013/0275656 | A1* | 10/2013 | Talagala | G06F 12/0246 |
| | | | | 711/103 |
| 2015/0193389 | A1 | 7/2015 | Rose | |
| 2015/0254344 | A1* | 9/2015 | Kulkarni | G06F 16/951 |
| | | | | 707/747 |
| 2017/0206408 | A1* | 7/2017 | Biswal | H04N 1/32251 |
| 2018/0013720 | A1* | 1/2018 | Sachdev | G06Q 10/10 |

OTHER PUBLICATIONS

ScreamingFrog, "Screaming Frog SEO Spider", Tool and Crawler Software, printed Nov. 30, 2017, pp. 1-11, https://www.screamingfrog.co.uk/seo-spider/#spider-features.

Softonic, "Xenu's Link Sleuth", 1.3.8, printed Nov. 30, 2017, pp. 1-3, https://xenus-link-sleuth.en.softonic.com/#app-softonic-review.

W3C, "W3C Link Checker", Version 4.81 (c), printed Nov. 30, 2017, p. 1, https://validator.w3.org/checklink.

Livingstone, "Check My Links", printed Apr. 19, 2018, p. 1, https://chrome.google.com/webstore/detail/check-my-links/ojkcdipcgfaekbeaelaapakgnjflfglf#.

Wikepedia, the free encyclopedia, "User: Dispenser/Checklinks", printed Nov. 30, 2017, pp. 1-5, https://en.wikipedia.org/wiki/User:Dispenser/Checklinks.

Vandemar, "A Quick Clarification on the Bad Neighborhood Detector", Bad Neighborhood Blog, Uncommon Webmastering, Aug. 26, 2007, pp. 1-9, http://bad-neighborhood.blogsblogsblogs.com/2007/08/26/a-quick-clarification-on-the-bad-neighborhood-detector/.

Google Search, "How Search Organizes Information", printed Nov. 30, 2017, pp. 1-3, https://www.google.com/search/howsearchworks/crawling-indexing.

Antonopoulos et al., "Efficient Updates for Web-Scale Indexes over the Cloud", 2012 IEEE 28th International Conference on Data Engineering Workshops, pp. 135-142.

WebpageFX, "WIKIGRABBER, The quick way to find Wikipedia pages that need citations and dead or broken link replacements", printed Nov. 30, 2017, pp. 1-2, https://www.webpagefx.com/seo-tools/wikigrabber/.

Broken Link Check, "Online Broken Link Checker", Online Dead Link Checking Tool, Dec. 8, 2017, pp. 1-3, http://www.brokenlinkcheck.com/.

Rajabi et al., "Analyzing Broken Links on the Web of Data: An Experiment with DBpedia", Journal of the Association for Information Science and Technology, vol. 65, Issue 8, Aug. 2014, 10 pages.

Mell et al., "The NIST Definition of Cloud Computing", National Institute of Standards and Technology, Special Publication 800-145, Sep. 2011, pp. 1-7.

* cited by examiner

| key | value |
|---|---|
| li | .23 |
| ol | .15 |
| p | .3 |
| tr | .17 |
| ... | ... |

FIG. 5

| | |
|---|---|
| Manufacturer | CASIO |
| Model | QV-4000 |
| Orientation (rotation) | top-left [8 possible values [21]] |
| Software | Ver1.01 |
| Date and time | 2003:08:11 16:45:32 |
| YCbCr positioning | centered |
| Compression | JPEG compression |
| X resolution | 72.00 |
| Y resolution | 72.00 |
| Resolution unit | Inch |
| Exposure time | 1/659 s |
| F-number | f/4.0 |
| Exposure program | Normal program |
| Exif version | Exif version 2.1 |
| Date and time (original) | 2003:08:11 16:45:32 |
| Date and time (digitized) | 2003:08:11 16:45:32 |
| Components configuration | Y Cb Cr - |
| Compressed bits per pixel | 4.01 |
| Exposure bias | 0.0 |
| Max. aperture value | 2.00 |
| Metering mode | Pattern |
| Flash | Flash did not fire |
| Focal length | 20.1 mm |
| MakerNote | 432 bytes unknown data |
| FlashPix version | FlashPix version 1.0 |
| Color space | sRGB |
| Pixel X dimension | 2240 |
| Pixel Y dimension | 1680 |
| File source | DSC |
| Interoperability index | R98 |
| Interoperability version | [null] |

FIG. 6A

| key | value |
|---|---|
| X resolution | 174 |
| Y resolution | 534 |
| File source | DSC |
| Compressed bits per pixel | 4.01 |
| ... | ... |

FIG. 6B

| key | value |
|---|---|
| IBM%20-%20United%20States_files/geo2.js | .01 |
| IBM%20-%20United%20States_files/530750480426306.js | .05 |
| IBM%20-%20United%20States_files/www.css | .002 |
| https://www.ibm.com/marketplace/search/us/en-us | .02 |
| ... | ... |

FIG. 7

| key | value |
|---|---|
| Watson | .17 |
| IBM | .25 |
| Cognitive | .15 |
| Cloud | .23 |
| ... | ... |

FIG. 8

CONTENT-BASED MANAGEMENT OF LINKS TO RESOURCES

BACKGROUND

The present invention relates to administration of linked information resources, and more particularly, to management of links in a content management system.

Content management systems (CMSs; referring to both classic CMSs such as TYPO3 or Joomla!, but also to CMSs in the broader sense such as Wikis, Slack, or social media), the main content is stored in pages. Within these pages other content is referenced. This is expressed by links. When a user clicks on a link, the referenced page is opened. A link comprises a source text or image (the content which is in most cases highlighted and can be clicked) and a target reference pointing to the page which will be opened when the user follows the link. The target reference can be expressed as a Uniform Resource Locator (URL). URLs can reference other pages, images, or even functions.

When new content is created within a content management system, the links are accurate. However, over time links may become outdated, for example because the target referenced by the URL has been deleted or moved to another location, the path has been changed, or the domain has been changed or is no longer reachable. Examples for scenarios typically causing outdated links include news feeds, where the target article may get moved out to an archive; descriptions for goods or products, which may get replaced by content for a new version of the product; web sites being re-organized or newly designed; merging companies having to update and combine their web sites; content being deleted or taken offline, e.g. by closing a project-related wiki at the end of a project; updated media files, etc.

BRIEF SUMMARY

Additional aspects and/or advantages will be set forth in part in the description which follows and, in part, will be apparent from the description, or may be learned by practice of the invention.

It is an objective of the present invention to provide for a computer-implemented method, a system and a computer program product for managing links to resources in a content management system. Embodiments of the invention are given in the dependent claims. Embodiments of the present invention can be freely combined with each other if they are not mutually exclusive.

In one aspect, the invention relates to a computer-implemented method for managing links to resources in a content management system, the content management system comprising a first link to a first target resource, the method utilizing a link analysis function, the link analysis function being adapted for: receiving a link to a target resource; determining a content model of the target resource based at least on content of the target resource; and storing the content model, the method comprising: executing the link analysis function with the link being the first link, the execution resulting in the content model being a first target model of the first target resource; monitoring the first target resource by repeating the execution of the link analysis function with the first link, the repeated execution resulting in the content model being a temporary first target model of the first target resource; and in response to detecting a difference between the first target model and the temporary first target model, triggering an automatic response action, the response action comprising storing a change record, the change record comprising information indicative of the detected difference.

In a further aspect, the invention relates to a system for managing links to resources in a content management system, the content management system comprising a first link to a first target resource, the system comprising a processor and memory, the memory having stored program instructions therein, a first section of the program instructions being a link analysis function, the link analysis function being adapted, when executed by the processor, for causing the system to: receive a link to a target resource; determine a content model of the target resource based at least on content of the target resource; and store the content model, a second section of the program instructions being adapted, when executed by the processor, for causing the system to: execute the link analysis function with the link being the first link, the execution resulting in the content model being a first target model of the first target resource; monitor the first target resource by repeating the execution of the link analysis function with the first link, the repeated execution resulting in the content model being a temporary first target model of the first target resource; and in response to detecting a difference between the first target model and the first temporary first target model, trigger an automatic response action, the response action comprising storing a change record, the change record comprising information indicative of the detected difference.

In yet another aspect, the invention relates to a computer program product for managing links to resources in a content management system, the content management system comprising a first link to a first target resource, the computer program product comprising a computer-readable storage medium, the computer-readable storage medium having embodied program instructions therewith, a first section of the program instructions being a link analysis function, the link analysis function being adapted, when executed by a processor of a computer system, for causing the computer system to: receive a link to a target resource; determine a content model of the target resource based at least on content of the target resource; and store the content model, a second section of the program instructions being adapted, when executed by the processor, for causing the computer system to: execute the link analysis function with the link being the first link, the execution resulting in the content model being a first target model of the first target resource; monitor the first target resource by repeating the execution of the link analysis function with the first link, the repeated execution resulting in the content model being a temporary first target model of the first target resource; and in response to detecting a difference between the first target model and the first temporary first target model, trigger an automatic response action, the response action comprising storing a change record, the change record comprising information indicative of the detected difference.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 5 shows an exemplary HTML tag map;

FIG. 6A shows an example of EXIF data information;

FIG. 6B shows an exemplary image metadata tag map;

FIG. 7 shows an exemplary URL tag map;

FIG. 8 shows an exemplary keyword tag map;

DETAILED DESCRIPTION

Figure 1:
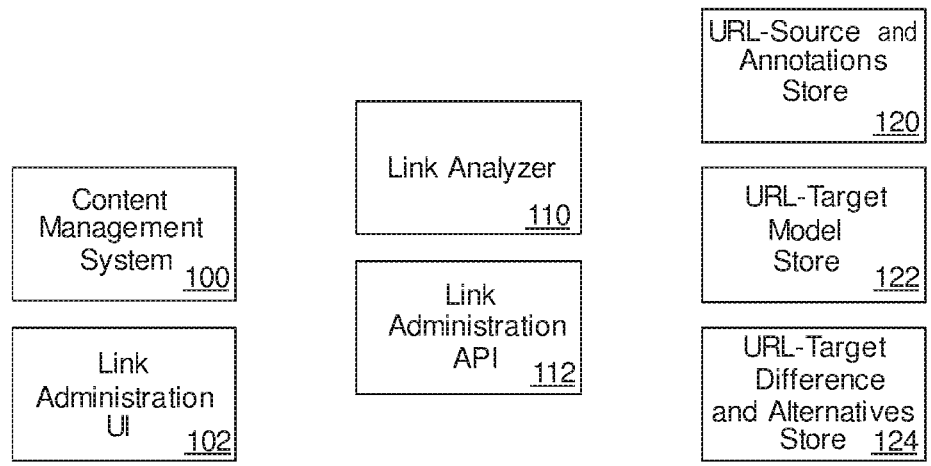
FIG. 1 is an overview over components of a system for managing links to resources in a content management system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

A link refers to a target resource by its logical address. The link is considered valid as long as any resource is available under the storage location encoded by this logical address. The link may become outdated when the target resource or its logical address is changed. This includes a deletion of the target resource, a displacement to another storage location, a renaming action, but also a change of the content of the target resource. As an example for the latter case, the presence of a particular news or blog article on a certain page may change after a specified period of availability.

At present, a content author or admin user of a content management systems (CMS) needs to detect and update outdated links manually. Especially when a link becomes outdated due to a content change, intelligent attention by a user may be required because the link is technically valid (the target is still available), but the link does no longer fulfill the intent the author had in mind when creating the link. Therefore, it would be desirable to have an automatic monitoring of changes to the target resource referenced by a given link.

An "information resource" (subsequently also referred to as a "resource" in short) is defined herein as any data structure referable by a single locator and storing a set of information of interest (the content). Such data structure may be incorporated by a file in a file system, examples, without limitation, including a text, hypertext, productivity or other basically alphanumeric document, an audio, video, image or other multimedia file, a binary file such as an executable, library or archive file, etc.

As understood herein, a "link" is a data structure which is assigned to a particular information resource (the source resource) and provides at least a logical locator (a logical address, e.g. a URL or an IP address) of a referenced information resource (the target resource). This includes links which are embedded into the source resource (such as hyperlinks using an anchor information), but also other kinds of assignment can be envisaged for a particular kind of information resource (e.g., a database record hosting a set of links detached from a piece of content). Anchor information may include original information of the source content (e.g. an anchor text in a text paragraph), but also information taken from other sources of information, including the target resource itself (inline link). The content provided by the target resource is referred to as the target content.

A "content management system" (CMS) 100 in the sense of the present disclosure at least comprises a set of managed information resources, software enabling the management of the resources (e.g. a virtual user interface, bots), and management data generated by the management activities (e.g. database, search indices).

The link analysis function disclosed herein comprises the step of receiving a link to a target resource. The receipt of a link may be triggered by various events, for instance when a new link is entered into the CMS 100, when a link is reached during crawling from a target resource, or when a known link is revisited during monitoring.

The link analysis function results in the generation and storage of a content model of the target resource. A "content model" of a resource is defined herein as an abstraction derived from at least a portion of the content of said resource. A content model should be sensitive to any changes made to the resource providing the content and/or the content (or the portion of content specified for representation by the content model) provided by the resource. A content model may comprise copies of the content but should not be limited to a pure content copies to ensure a minimum level of productivity of the method. Preferably, a content model is structured in a manner so as to enable or facilitate a comparison of characteristic features of the content.

Depending on the conditions (e.g. size) and requirements of a particular CMS 100, the monitoring may be performed by repeating the link analysis function, for instance, based on a schedule or trigger events, and/or in a uniform or individual manner for all or some resources in the CMS 100.

In case that a difference is detected between two (subsequent) target models of the first target resource, the method results in the storage of information indicative of the detected difference in a change record. Such indicative information may be generated and organized in a number of known ways, with non-limiting examples including a "before-after" juxtaposition of content copies and/or data derived from the changed content; calculated comparison data such as a "diff" output; and/or a user name, timestamp and other information characteristic for the change retrieved from the CMS 100.

A difference in or change to a resource is understood here as not being limited to affecting solely the content provided by the resource, but rather also the resource itself (a physical of logical relocation or deletion of the resource results in an equivalent change (loss) of its content).

Embodiments of the invention may advantageously yield a significant simplification of managing linked content for web masters or other people who maintain and are responsible for links they create. The information generated by the method may be used at a later point e.g. to support decision making on outdated links, to aggregate information on similar resources and/or possible replacements for an outdated link, and to provide an enhanced set of response actions from which a suitable procedure may be chosen.

Enhancements and facilitations provided by embodiments may result in a continuous maintenance of the CMS 100 with a high link accuracy level, i.e. a high agreement between the intended target content of a link and the actual content of the target resource referenced by the link. This may be particularly important for search engine optimization (SEO), i.e., optimizing a website so that it is considered relevant by automatic indexing and ranking algorithms such as those employed by search engine providers. In case such a linked content change is detected, disclosed embodiments can also be used to propose resources with similar content that might be linked instead.

Embodiments may also be useful to improve the quality of search results by yielding annotated result links which can be trusted to contain (up to a certain accuracy) the original content that existed when the link has been created. So, procedures for evaluating link annotation properties beyond existing (do not) follow annotations may be integrated into the crawling and ranking process of search engines.

Further, refreshing the web index inside search engines is a very resource-demanding task that requires significant computation power. Techniques according to embodiments may enhance this process by limiting indexing updates to those linked resources that really changed significantly.

According to embodiments, the content model comprises a fingerprint of the target resource, the fingerprint comprising an associative array of key-value pairs for a predetermined set of key variables.

This may facilitate the comparison of arbitrary pieces of content by defining a comparison standard, and by breaking down the complexity of comparison to comparing values of the same key variable. The key variables (also short "keys" in the following) may be specified by a user, preferably at setup time, for example by selection from a list of keys or templates comprising groups of keys, and/or by manual entry using a programming language.

According to embodiments, the method further comprises utilizing a fingerprint comparator function, the fingerprint comparator function being adapted for: receiving a first fingerprint of a first resource; receiving a second fingerprint of a second resource; receiving a specification of key variables eligible for the comparison; deriving, for each of the eligible key variables present in both the first fingerprint and the second fingerprint, a difference value from the value of the key variable in the first fingerprint and the value of the key variable in the second fingerprint; and combining the derived difference values to a comparison figure.

A difference value is understood herein as a mapping which assigns a countable value to a pair of key values received as an input. The mapping must include one unique "zero" value corresponding to equal input values. Similarly, a comparison figure is understood herein as a mapping which assigns a countable figure to a set of difference values received as an input, and must include one unique "zero" figure in case that all received difference values have their respective "zero" value.

In total, the fingerprint comparator function may have the advantage of providing a numerical means for assessing equality for a set of keys of potentially different data types. The difference value provides a comparison result between two resources condensed into a single value. This facilitates a further numerical processing (e.g. comparison or visualization) of the comparison result.

In addition, the fingerprint comparator function provides a means for specifying a set of eligible keys. This may advantageously increase a user's freedom for configuration and also the significance of the comparison result. Furthermore, the method may be executed with a reduced resource consumption as key considered insignificant can be opted out from comparison.

According to embodiments, the detection of the difference between the first target model and the temporary first target model comprises executing the fingerprint comparator function with the first fingerprint being the fingerprint of the first target model and the second fingerprint being the fingerprint of the temporary first target model, the detection being based on evaluating the comparison figure, the information indicative of the detected difference being based on the comparison figure.

This may have the advantage of monitoring and tracking changes to the first target resource with a lower demand for computational resources. The comparison figure may be used to formulate more refined conditions for triggering the response action, the change record may comprise the comparison figure and/or further information derived from or obtained using the comparison figure. When stored in the change record, the comparison figure may be used later for follow-up actions such as annotating the first link (e.g., by reprogramming the first link for being rendered with a style indicative of the detected difference).

According to embodiments, the comparison figure comprises a non-negative distance, the distance being zero only if all derived difference values are indicative of equality.

A distance between two instances of content may be used to define a content-based metric. This may allow for implementing a link management environment with more sophisticated mathematical methods (e.g. vector addition of subsequent changes).

According to embodiments, the comparison figure comprises a weighted distance, the specification further comprising a grouping of the eligible key variables into data categories, each data category being associated with a predetermined weight factor, the weighted distance being based, for a given data category, on the distance calculated for the keys in the data category and on the weight factor associated with the data category.

A weighted distance may be a beneficial figure to increase the significance of comparison. Depending on the purpose of the target resource, some data categories may be more relevant than others. For instance, the data categories may be chosen to reflect different data types of the target content. As an example, audio content may be weighted high compared to text and image data if the target resource is a podcast, while it may be rather irrelevant on a wiki dedicated to graphics software development. Weights may be defined globally (in relation to the CMS) or based on individual resources, with rules defining positive or negative exceptions based on resource position, purpose, content types and the like.

According to embodiments, the weighted distance comprises the weighted sum of the comparison figures over all data categories. The weighted sum is a function of low computational complexity and may therefore enable to perform the comparison with a lower demand for computational resources. It will, however, be apparent to a person skilled in the art to use a more sophisticated function in the case.

According to embodiments, the calculation of the comparison figure comprises, for a given key variable, normalizing the value of the key variable in the first fingerprint and the value of the key variable in the second fingerprint.

A normalization function may be chosen from various routines. In an non-exhaustive example, the two values are normalized to a range between zero and one. This may include scaling the values such that the greater value is normalized to one, or that the value of one corresponds to the sum of both values. Normalization to a range between zero and one may advantageously reduce or eliminate systematic weight differences between keys defined on different value ranges. Still in this example, the values are preferably normalized to the full range between and including the values of zero and one.

It is understood that the values can be normalized to any range which is considered to yield a useful representation of the actual value space of the given key variable. Preferably, all key variables pertaining to the two fingerprints, or alternatively all key variables within a specific group, are normalized to a same range.

According to embodiments, the calculation of the comparison figure further comprises, in case that either the first fingerprint or the second fingerprint is lacking a given key variable, expanding the fingerprint lacking the given key variable by the given key variable and initializing the given key variable to a default value in the expanded fingerprint.

Such "default filling" rule may beneficially allow a user to change the definition of a fingerprint at runtime, and moreover, to merge resource sets (including whole CMS s 100) which had been managed before with differently defined fingerprints. A default value may be chosen as any valid value of the data type of the respective key variable. Preferably, the default value is chosen such that it is recognizable by a human or a computer algorithm as having no meaning and/or will not cause a strong influence on subsequent calculations of comparison figures or other known calculations. In a more specific example, the added key variable is initialized to a zero value or equivalent (e.g. an image size of 0 pixels, an HTML tag count of 0, an empty string, the null character, Boolean "FALSE", etc.). A zero initialization may ensure, for instance, that the added key variable creates no artefactual weight in a subsequent comparison figure calculation. In another example, the added key variable is initialized to a meaningless value which may allow for handling the added key variable with an exception routine (e.g. a tag count of −1, a date of Jan. 1, 1901, etc.).

According to embodiments, the method further comprises performing an external comparison of the first target resource to a second target resource, the external comparison comprising: receiving a second link to the second target resource; executing the link analysis function with the link being the second link, the execution resulting in the content model being a second target model of the second target resource; executing the fingerprint comparator function with the first fingerprint being the fingerprint of the first target model and the second fingerprint being the fingerprint of the second target model; and storing the comparison figure.

The external comparison may beneficially enable a quantitative comparison of two different target resources. Such comparison may serve as a basis for assessing the similarity of two target resources. In particular, identical target resources may be detected easily this way.

The comparison figure may be used to formulate more refined conditions and routines for responding to an outdated link. As discussed in more detail further blow, the second target resource may become a candidate for substituting the target of the first link e.g. if it has a higher similarity to the first target resource before the change (represented by the first target model) than the changed first target resource (represented by the temporary first target model).

According to embodiments, the external comparison is performed for a plurality of different second links to second target resources and resulting in a plurality of the comparison figures.

This may yield the benefit of providing a matrix or table of comparison figures with respect to the first resource. Resources similar to the first resource may then be identified by a simple table lookup, which may require substantially less computational resources than the calculation of the comparison values itself. A calculation of such table may be followed by further calculations e.g. to determine the target resources with highest similarity to the first resource, and may be performed at a time when consumption of computational resources is low. This way, similarity information may be held available for a user who requests such information at a later time.

According to embodiments, the response action further comprises ranking the plurality of different second links by value of the comparison figure, the response action further comprising grouping the second links according to their similarity in terms of the comparison figure into a list of suggested links, the information indicative of the detected difference further comprising the list of suggested links.

A list of candidate links to resources with a high similarity to the first resource may advantageously enable a quicker reaction on content changes than would be possible by detecting and updating outdated links manually. For instance, the response action may provide further that the list be presented to an administrator or other user responsible for the content. The user may then select one of the suggested links as a substitute for the first link if an update of the link appears appropriate. In response to the user selection, an automatic update of all source resources comprising the first link may be performed. In this way, a timely and comprehensive management of links in a content management system with substantially reduced user effort and time delay may be implemented.

Alternatively, the list of suggested links may be used to perform a fully automatic response action. In an example, the first link is automatically replaced by the most similar link in the list in all source resources comprising the first link. This may be accompanied by further conditions, such as suppressing automatic replacement if the similarity is below a threshold value for all links in the list, and further actions such as incorporating the replacement link into the respective source resources with a style annotation indicating that the link was replaced automatically.

According to embodiments, the generation of the list of suggested links further comprises crawling eligible second target resources from the first target resource, and performing the external comparison for each of the eligible second target resources.

This may beneficially extend the set of second target resources to be compared with the first target resource, and hence, provide a more comprehensive basis for the generation of the list of suggested links. Accordingly, second target resources similar to the first target resource may be found with a higher probability. The crawling of further target resources, starting from the first target resource, may be subject to separate configuration. For example, a recursion depth limit may be defined to control the growth of the set of second target resources, or the eligibility of a second target resource may be defined by a criterion such as content language, keywords, or age of content.

According to embodiments, the link analysis function further comprises updating a link store with the link. Storing a copy of an analyzed link in a link store may facilitate the monitoring process because the repetition of the link analysis function can be performed by receiving the first link directly from the link store instead of having to repeat crawling the source resource from which the link was originally received. The monitoring of the first link may thus be performed with a reduced demand for computing resources. Furthermore, keeping the link copy in the link store up to date may provide the capability to track the target resource even if the link is removed from its source resource, thus increasing the reliability of the procedure.

According to embodiments, the link store further stores a warning criterion for each of the stored links, the response action being triggered only if the comparison figure between the first fingerprint and the temporary first fingerprint fulfills the warning criterion.

A warning criterion for the response action may beneficially increase flexibility by providing an additional means for customization. The warning criterion may further reduce the demand for computational resources, because the response action, which may include computationally demanding tasks such as determining the comparison figure for a large number of second target resources, may be skipped for all changes of the target resource which are considered minor according to the warning criterion. The warning criterion may represent a single change, e.g. triggering the response action only if the comparison figure is indicative of a similarity below a specified threshold, or be cumulative, e.g. triggering the response action only if the (vector) sum of distances caused by subsequent changes exceeds a specified threshold.

According to embodiments, the link store further stores additional information for each of the stored links, the additional information being selected from the group of: a monitoring period for the repetition of the execution of the link analysis function with the first link; the data categories to be used for generating a fingerprint of the target resource; and the weight factors associated with the data categories.

Collecting additional information for each link may have the advantage of providing enhanced filtering possibilities. Thus, a given monitoring cycle may be restricted to a subset of links of a particular interest, or which are deemed likely to have become outdated since their latest update, or the monitoring may be skipped for links which are still within the monitoring period. This may further reduce the computational resource requirements. Similarly, further conditions for the link analysis function or the response action may be formulated based on the additional information. In the particular case, it may be worthwhile to include in the additional information further information differing from the mentioned monitoring period, data categories and weight factors.

According to embodiments, the response action further comprises a routine selected from the group of: reprogramming the first link in a source resource of the first link for being rendered with a style indicative of the detected difference; replacing the first link with a link to a target resource having a comparison figure indicative of highest similarity; notifying a user of the content management system about the detected difference; suggesting the user a link to a target resource having a comparison figure indicative of highest similarity; and, in response to a replacement link being specified by the user, updating the resources of the content management system with the replacement link, and executing the link analysis function with the link being the replacement link.

Providing the response action with further routines may significantly enhance the toolset for managing links in a CMS 100 in various beneficial ways depending on the nature of the selected routine. For instance, reprogramming the first link may give a consumer of the content provided by the resources of the CMS 100 an indication (e.g., visually) that the target content has been found to differ from the target content the resource provided at the time when the link was created. This may improve the consumer's experience with the target content. Furthermore, such link annotation may be interpreted by a search engine and improve the ranking result of the target content.

Routines involving a user (e.g. an administrator of content moderator, as opposed to said consumer) may enhance and facilitate the link management process and improve the effectivity of the method due to the presence of human feedback. Executing the link analysis function with the replacement link may result in an update of the link store and/or a collection of the additional information for the replacement link, which may improve the accuracy and enhance the flexibility of the method. In the particular case, it may be worthwhile to include in the response action further routines differing from the mentioned reprogramming, replacing, notifying suggesting, updating and analyzing routines.

According to embodiments, the content model further comprises information selected from the group of: text, keywords, language, topics, inverted index, pictures, metadata, change history, dynamic nature, usage statistics, and/or structure of the target resource; an identifier of a content management system or framework which was used to create the target resource; an indicator for a logical location of the target resource relative to a target space comprising the target resource; and a list of incoming links to the target resource.

The "dynamic nature" of a resource is understood herein as an information describing an expectation regarding the likelihood of the target content to change. This may include a qualitative descriptor (e.g. static, periodic, non-periodic) and/or a quantitative measure (e.g. a periodicity of content updates or monitoring revisits).

The variety of information stored in the target model may improve the quality if the method by enabling to define more refined filtering, comparison and/or response criteria. In an example, the dynamic nature is used to define separate revisit periods for periodic and non-periodic resources. This may further reduce the demand for computational resources. In another example, the resources of the content management system were merged from separate sets of resources which had previously been managed with different CMSs. As the previous CMSs generated different types of metadata for the managed resources, it is helpful to perform the link analysis function and/or the fingerprint comparator function with individual criteria for resources of the respective sets, define rules for comparing resources from two different sets, define routines for completing missing metadata and/or fingerprint keys for resources of a specific set, etc. Such routines may be substantially facilitated if the original CMS is known at runtime.

FIG. 1 shows a block diagram of an exemplary system with which embodiments of the disclosed method may be executed. The content management system (CMS) 100 contains content in form of resources and links. A Link Administration UI 102 is used to show outdated links and provide alternative links to resources with equal or similar content. The Link Administration UI 102 uses a Link Administration API 112 to retrieve information from three information stores depicted on the right-hand side: A URL-Source And Annotation (USAA) Store 120 stores copies of links including source and target information as well as additional annotations such as the warning level when a user wants to be informed in case the target of a link changes. The USAA store 120 may also contain the fingerprint of the source resource. An exemplary description of how a fingerprint of a resource can be calculated is given further below.

A URL-Target Model (UTM) Store 122 stores the content model of the referenced resource, which may include text, keywords, language, topics, inverted index, pictures, meta data, and structure of the resource. This may also comprise information like which CMS 100 or framework was used to create the resource, location of the resource in a web site compared to other content (top of the tree, leaf, etc.), incoming and outgoing links, dynamic nature of the resource, change history of the resource, and usage statistics. The UTM Store 122 may also comprise the fingerprint of the target resource.

A URL-Target Difference and Alternatives (UTDA) Store 124 stores changes between the initial content model and a subsequent analysis of the resource referenced by the same link. An exemplary description of how the difference between two resources can be calculated based on two fingerprints is given further below. In addition to the model difference, alternative link proposals may be stored in the UTDA Store 124 referring to resources with similar or equal content.

A Link Analyzer component (LA) 110 is configured for checking links in the USAA Store 120 (continuously, periodically, on demand etc.), calculating differences to the respective content models stored in the UTM Store 122, and storing them in the UTDA Store 124. Additionally, potential alternative resources with similar model information in the UTM Store 122 may be selected and stored in the UTDA Store 124 as well.

Figure 2:
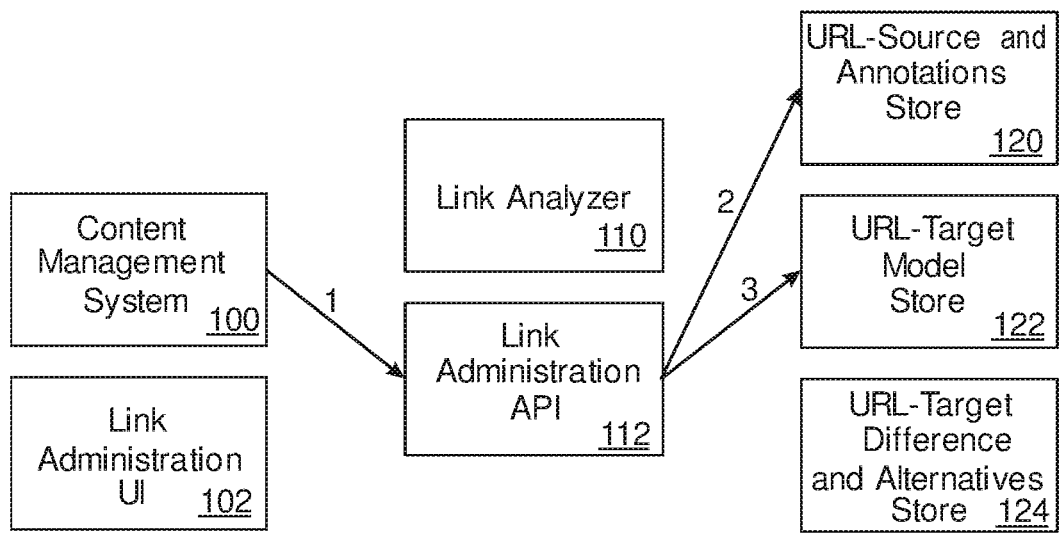
FIG. 2 depicts a schematic workflow for adding or updating a link.

FIG. 2 schematically illustrates an exemplary process flow for adding or updating a link using the system of FIG. 1. When a user adds a link to the CMS 100, the CMS 100 is calling (2-1) the Link Administration API 112. The call (2-1) contains information about the source of the link in the CMS 100, the target URL, and additional information about the link added by the user: This may be keywords a user would expect to show in the target resource or a time frame within which the target resource is expected to be updated. This step (2-1) might comprise a user-specific configuration process, such as selecting relevant criteria for describing the linked content from a predefined list of criteria, weighting their relevance for changes, etc.

This link information is stored (2-2) in the USAA Store 120. Then the system analyses the target resource and creates or updates (2-3) a content model of the resource in the UTM Store 122.

Figure 3:
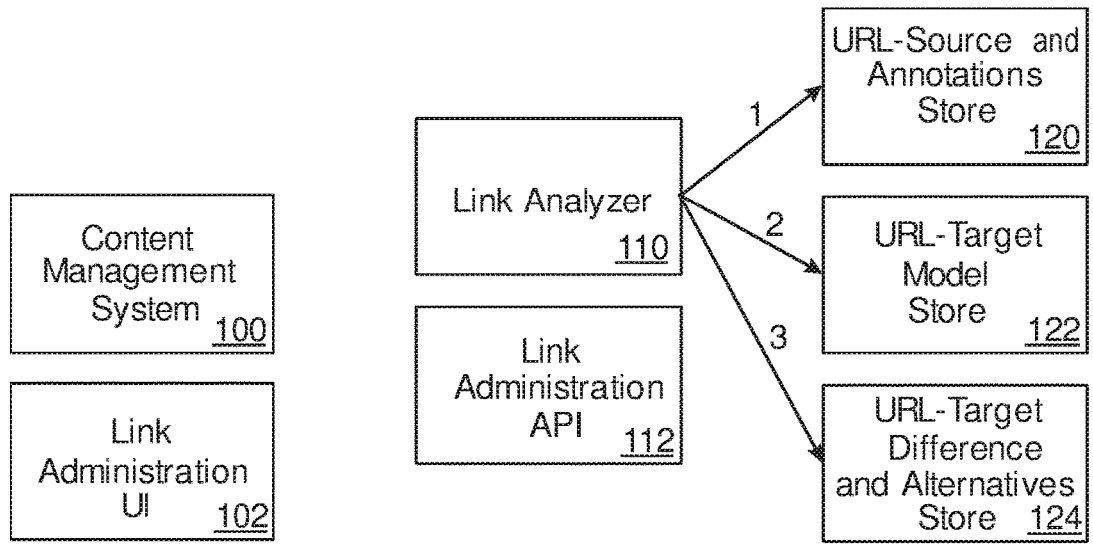
FIG. 3 depicts a schematic workflow for analyzing links.

FIG. 3 schematically illustrates a process flow for analyzing a link using the system of FIG. 1. The LA component 110 checks if target resources referenced by links have been changed. For this, a current list of links is retrieved (3-1) from the USAA Store 120. Then the current target content is analyzed and a temporary target model is created. This temporary target model is compared (3-2) to the target model stored for the link in the UTM Store 122.

When differences between the temporary target model and the stored target model are detected, a new record is created (3-3) in the UTDA Store 124. This record may contain the following information: changed content, such as text, images, meta data, etc.; an indication to which degree the content has been changed, e.g. based on weights a user specified as annotations in the USAA Store; a rated list of alternative links, etc.

When a detection of alternative links is desired, this can be performed by the LA component 110 by analyzing resources of a target space and/or target resources referenced by links stored in the USAA Store 120. Examples of a target space include, without limitation, a web site containing the target resource, or a tree of resources comprising content in a specified language, crawled from the target resource up to a maximum recursion depth m=3.

An exemplary target space analysis may comprise following (crawling) links in the target resource and building a site index of the target space; building temporary target models by analyzing the resources of the target space; and comparing the similarity of the original target model stored in the UTM Store 122 with the temporary target models representing the resources of the target space. An exemplary USAA Store analysis may comprise analyzing the targets stored in the USAA Store 120 and checking whether other similar links are already available in the system or have been changed within a specified period of time.

Figure 4:
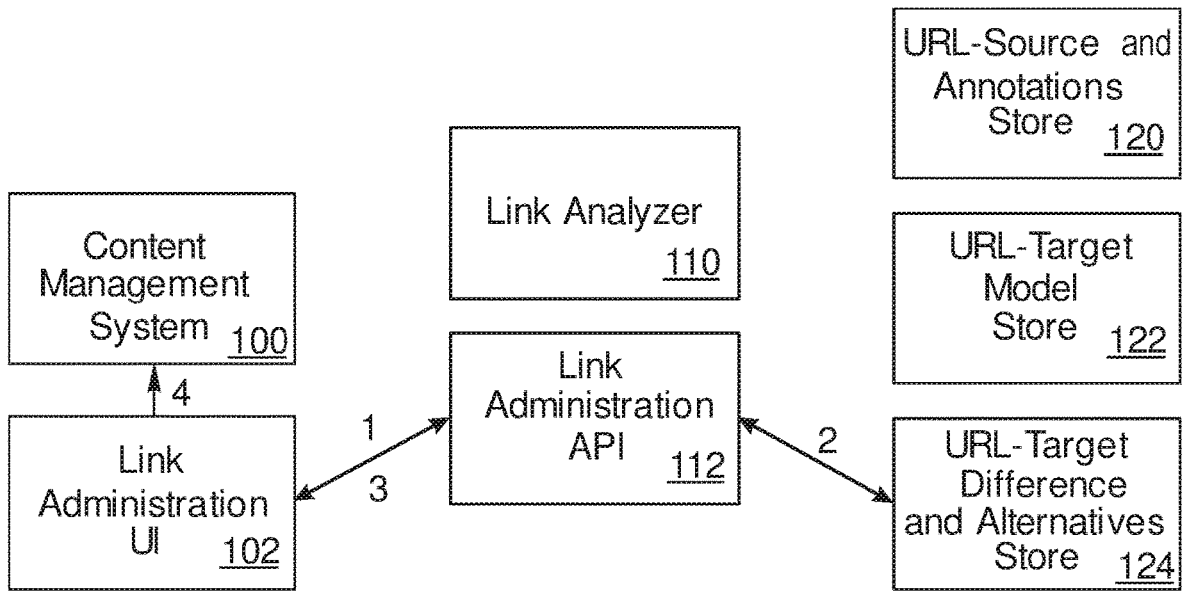
FIG. 4 depicts a schematic workflow for retrieving outdated and alternative links.

FIG. 4 schematically illustrates a process flow for retrieving outdated and alternative links using the system of FIG. 1. A user checks outdated links in the Link Administration UI 102. The Link Administration UI 102 uses the Link Administration API 112 to request (4-1) a list of outdated links. The Link Administration API 112 retrieves (4-2) the list of outdated links together with proposed alternatives from the UTDA Store 124 and passes (4-3) the information back to the Link Administration UI 102. When the user selects one of the alternatives in the Link Administration UI 102, the link is updated (4-4) in the CMS. When a link is updated by the user in the CMS 100, the flow as depicted in FIG. 2 is executed. This leads to updated records in both the USAA Store 120 as well as in the UTM Store 122.

Alternatively, the CMS 100 can use the Link Administration API 112 directly to retrieve outdated links, annotate (e.g. colorize) the links in the CMS 100 accordingly, automatically replace them with links having similar content, and/or trigger further automated processes based on the information about changed links and potential alternatives.

In the following, it is described how a fingerprint list can be calculated for one resource. The resource is analyzed based on a set of criteria represented by key variables. The exact criteria need to be specified beforehand, preferably when the system is set up. This may allow for a comprehensive comparison of resources afterwards based on the same set of criteria.

While the set of criteria needs to be determined up-front, the set itself is flexible. The following description is based on a grouping of the fingerprint key variables into four data categories (C=4). However, this selection of data categories is meant for demonstration purposes only and may be adapted in any desired manner for the particular case.

For each data category a fingerprint map is calculated, which in turn is part of the fingerprint list of the resource.

The following four data categories have been selected for the present example: HTML tags; image meta data; links; and keywords. The calculation of a fingerprint map is described in more detail for each of the four data categories in the following sections:

FIG. 5 shows an illustrative excerpt of an exemplary fingerprint map 500 for the data category "HTML tags". The fingerprint map 500 for HTML tags is calculated in the following way: For each tag like <li>, <ol>, <p>, <tr>, etc., the system counts the occurrence in the HTML source code of the resource. In addition, the sum of occurrences of all the tags is determined as SUM_TAGS. Then fingerprint map 500 with key-value pairs is created by using the tag name as key and the determined occurrence for the tag divided by SUM_TAGS as value.

FIG. 6B shows an illustrative excerpt of an exemplary fingerprint map 600 for the data category "image metadata". The fingerprint map 600 for image metadata is calculated as follows: For each image on the resource, additional metadata is gathered. One example for the metadata can be the EXIF information stored in a JPEG file. An illustrative EXIF dataset 602 is shown in FIG. 6A, which will be used as a basis for the following explanation.

Based on a subset of the available metadata, fingerprint map 600 with key-value pairs is created by using a subset of the EXIF metadata entries as keys and the following rules for building the values for all images on the resource: For numeric values and date and time values, calculate the average value across all images in the resource. For all other values, determine the respective value which is found most frequently across all images.

FIG. 7 shows an illustrative excerpt of an exemplary fingerprint map 700 for the data category "links". The fingerprint map 700 for links is calculated in the following way: For each URL found in any <a>, <img> or other HTML tags, the system counts the number of occurrences in the HTML source code of the resource. In addition, the sum of occurrences of all URLs is determined as SUM_URLS. Then fingerprint map 700 with key-value pairs is created by using the URL as key and the determined occurrence for the URL divided by SUM_URLS as value.

FIG. 8 shows an illustrative excerpt of an exemplary fingerprint map 800 for the data category "keywords". The fingerprint map 800 for keywords is calculated like the ones before: For each keyword found in the HTML source code of the resource, the system counts the number of occurrences. In addition, the sum of occurrences of all keywords is determined as SUM_KEYWORDS. Then fingerprint map 800 with key value pairs is created by using the keyword as key and the determined occurrence for the keyword divided by SUM_KEYWORDS as value. The list of keywords can be static or can be adapted based on the resources processed by the system.

After calculating all four fingerprint maps 500, 600, 700, 800 in this example, the list of maps can be stored in the USAA store 120 (for source resources) or the UTM Store 122 (for target resources). This may allow the system to perform further processing steps based on the analysis results, such as determining the similarity of two resources.

A comparison figure of two resources can be calculated in two steps: First, a fingerprint (a list of fingerprint maps) is calculated for each of the resources to be compared, and stored in the USAA store 120 for source resources and in the UTM Store 122 for target resources. In a second step, the two fingerprint lists are compared using the fingerprint comparator function, resulting in the comparison figure.

Both steps are described in the subsequent sections for the example of the comparison figure being a weighted distance.

For comparing two fingerprints, each fingerprint map of resource 1 is compared with the same fingerprint map of resource 2. For example, the two keyword fingerprint lists are compared to each other. This comparison yields a distance D(c) for each data category, the data categories being labeled with c being between 1 and 4 in this 4-category example (C=4).

In the following, it is described how D(c) is calculated for two fingerprint maps here referred to as map p and map q. First, p and q are completed with missing keys. This can be done by adding the respective missing key, where necessary, to the map where it is missing, initialized to a 0 value. The number of keys thus equalized for both maps is referred to as N.

Then, values of the maps are turned into normalized numbers between 0 and 1. This can be achieved by applying e.g. the following rules: When two string values are the same, they are replaced with the value 1 in both maps. When two string values are different, they are replaced with value 0 in one map and value 1 in the other map. For non-string values greater than 1, they are replaced by the values divided by the bigger value of the two maps.

After normalizing the two maps, a Euclidean distance can be calculated by equation (1) below:

$$D(c)=\sqrt{((p\_1-q\_1)^2+(p\_2-q\_2)^2+\ldots+(p\_N-q\_N)^2)}/\sqrt{N}. \quad \text{Equation (1)}$$

The division by $\sqrt{N}$ normalizes the result to be between 0 and 1 independent of the number of keys (N) in the maps being compared.

In the USAA store 120 the user can store weights for the comparison, here referred to as W(c) with c between 1 and C=4. This allows the user to specify that for example the image similarity is more important than the keyword similarity for a specific source resource. The default value for all W(c) is 1.

With the distance factors D(c) and the weights W(c), the weighted distance S can be calculated by equation (2) below:

$$S=\Sigma\_(c=1)^{C} [ W(c)D(c) ] \quad \text{Equation (2)}$$

This weighted distance S can then be used by the system to determine that e.g. a link is broken, or to propose similar resources to the user in order to restore the link.

An implementation of the computer program product may comprise a piece of standalone software configured to run parallel to a content management system, or be integrated (e.g. as a module, library etc.) with a content management system or other content processing software (e.g. a search engine).

Figure 9:
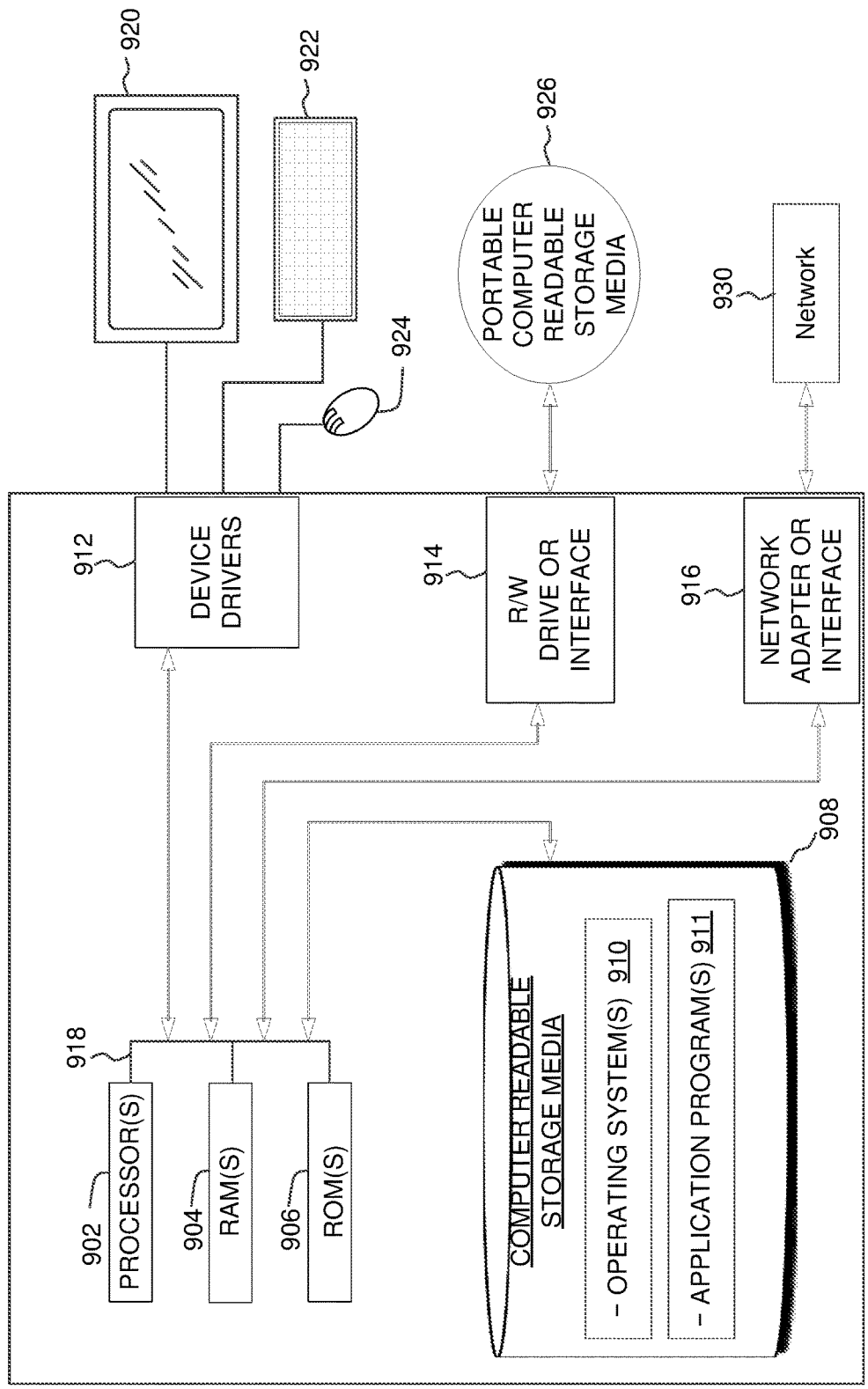
FIG. 9 is a block diagram of components of a computing device of the system for managing links of FIG. 1, in accordance with embodiments of the present invention.

FIG. 9 depicts a block diagram of components of a system for managing links to resources in a content management system 100 of FIG. 1, in accordance with an embodiment of the present invention. It should be appreciated that FIG. 9 provides only an illustration of one implementation and does not imply any limitations with regard to the environments in which different embodiments may be implemented. Many modifications to the depicted environment may be made.

The system for managing links to resources in a content management system 100 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, CMS 100 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The system for managing links to resources in a content management system 100 may also include a R/W drive or interface 914 to read from and write to one or more portable computer readable storage media 926. Application programs 911 on the system for managing links to resources in a content management system 100 may be stored on one or more of the portable computer readable storage media 926, read via the respective R/W drive or interface 914 and loaded into the respective computer readable storage media 908.

The system for managing links to resources in a content management system 100 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the system for managing links to resources in a content management system 100 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The system for managing links to resources in a content management system 100 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
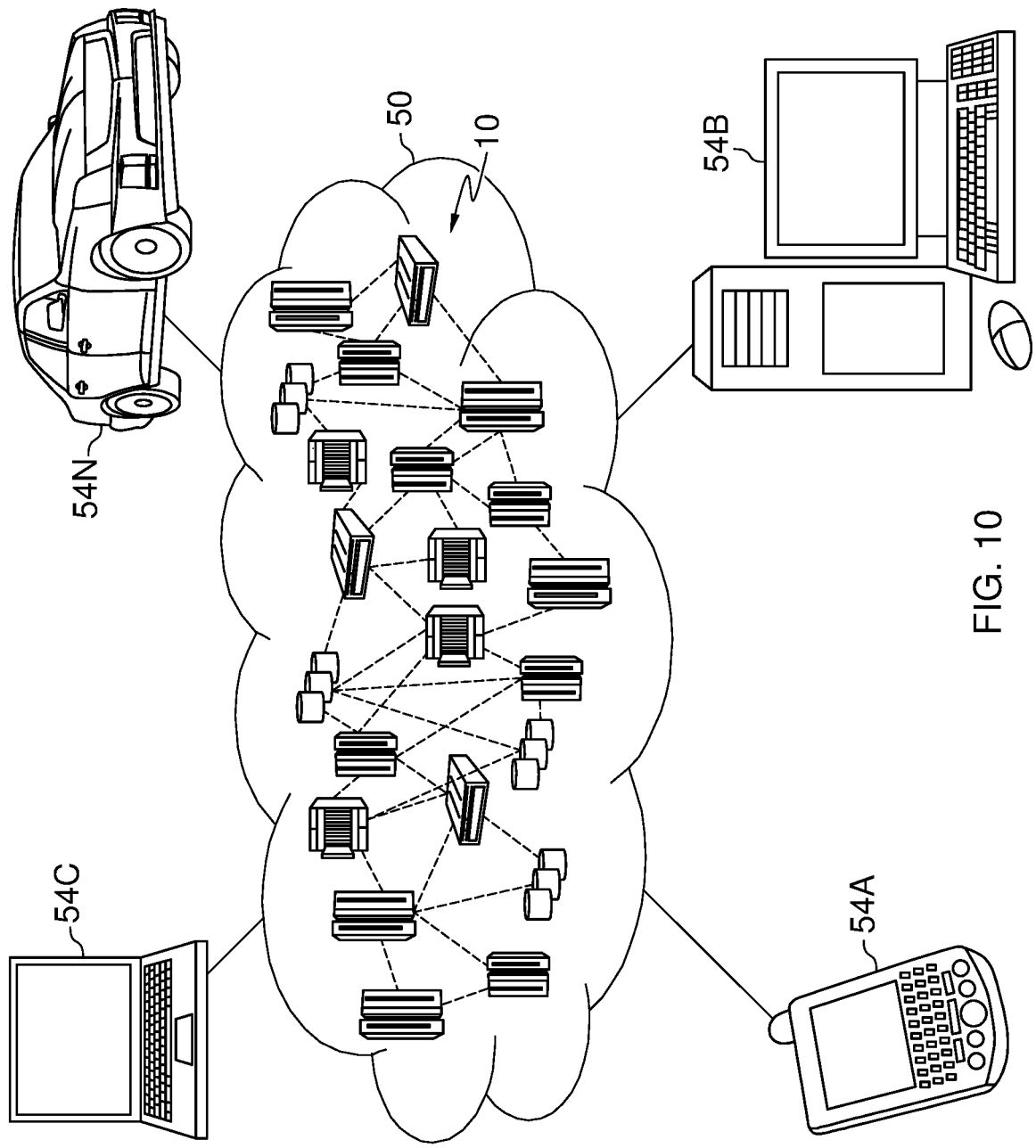
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
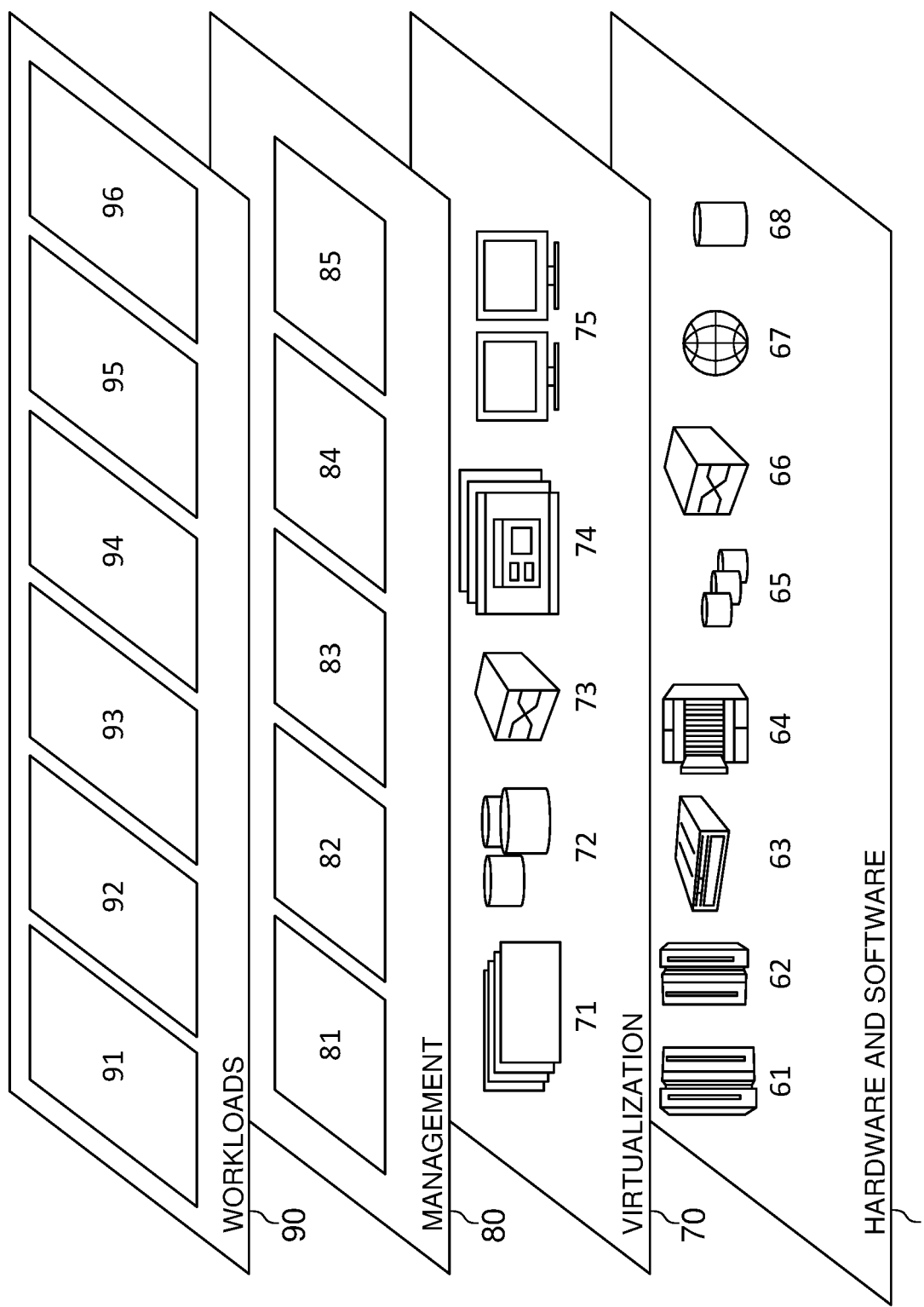
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for managing links to resources in a content management system 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method comprising:
  receiving a first link to a first target resource;
  determining a content model of the first target resource based at least on content of the first target resource, the content model comprising a fingerprint of the target resource;
  storing the content model,
  executing a link analysis function with the first link, the execution resulting in the content model being a first target model of the first target resource;
  monitoring the first target resource by repeating the execution of the link analysis function with the first link, the repeated execution resulting in the content model being a temporary first target model of the first target resource;

detecting a difference between the first target model and the temporary first target model by executing a fingerprint comparator function, the fingerprint comparator function being adapted for:
receiving a first fingerprint of a first resource;
receiving a second fingerprint of a second resource;
receiving a specification of key variables eligible for the comparison, the specification comprising a grouping of the eligible key variables into data categories, each data category being associated with a predetermined weight factor;
deriving, for each of the eligible key variables present in both the first fingerprint and the second fingerprint, a difference value from the value of the key variable in the first fingerprint and the value of the key variable in the second fingerprint; and
combining the derived difference values into a comparison figure; and in response to detecting a difference between the first target model and the temporary first target model, triggering an automatic response action, the response action comprising storing a change record, the change record comprising information indicative of the detected difference.

2. The method of claim 1, wherein the fingerprint comprises an associative array of key-value pairs for a predetermined set of key variables.

3. The method of claim 2, wherein the executing the fingerprint comparator function further comprises the first fingerprint being the fingerprint of the first target model and the second fingerprint being the fingerprint of the temporary first target model, the detection being based on evaluating the comparison figure, the information indicative of the detected difference being based on the comparison figure.

4. The method of claim 2, the comparison figure comprising a non-negative distance, the distance being zero only if all derived difference values are indicative of equality.

5. The method of claim 2, the comparison figure comprising a weighted distance, wherein the weighted distance is based, for a given data category, on the distance calculated for the keys in the data category and on the weight factor associated with the data category.

6. The method of claim 5, the weighted distance comprising the weighted sum of the comparison figures over all data categories.

7. The method of claim 2, the calculation of the comparison figure comprising, for a given key variable, normalizing the value of the key variable in the first fingerprint and the value of the key variable in the second fingerprint.

8. The method of claim 2, the calculation of the comparison figure further comprising, in case that either the first fingerprint or the second fingerprint is lacking a given key variable, expanding the fingerprint lacking the given key variable by the given key variable and initializing the given key variable to a default value in the expanded fingerprint.

9. The method of claim 2, further comprising performing an external comparison of the first target resource to a second target resource, the external comparison comprising:
receiving a second link to the second target resource;
executing the link analysis function with the link being the second link, the execution resulting in the content model being a second target model of the second target resource;
executing the fingerprint comparator function with the first fingerprint being the fingerprint of the first target model and the second fingerprint being the fingerprint of the second target model; and
storing the comparison figure.

10. The method of claim 9, the external comparison being performed for a plurality of different second links to second target resources and resulting in a plurality of the comparison figures.

11. The method of claim 10, the response action further comprising ranking the plurality of different second links by value of the comparison figure, the response action further comprising grouping the second links according to their similarity in terms of the comparison figure into a list of suggested links, the information indicative of the detected difference further comprising the list of suggested links.

12. The method of claim 11, the generation of the list of suggested links further comprising crawling eligible second target resources from the first target resource, and performing the external comparison for each of the eligible second target resources.

13. The method of claim 1, the link analysis function further comprising updating a link store with the link.

14. The method of claim 13, the link store further storing a warning criterion for each of the stored links, the response action being triggered only if the comparison figure between the first fingerprint and the temporary first fingerprint fulfills the warning criterion.

15. The method of claim 13, the link store further storing additional information for each of the stored links, the additional information being selected from the group of: a monitoring period for the repetition of the execution of the link analysis function with the first link; the data categories to be used for generating a fingerprint of the target resource; and the weight factors associated with the data categories.

16. The method of claim 1, the response action further comprising a routine selected from the group of: reprogramming the first link in a source resource of the first link for being rendered with a style indicative of the detected difference; replacing the first link with a link to a target resource having a comparison figure indicative of highest similarity; notifying a user of the content management system about the detected difference; suggesting the user a link to a target resource having a comparison figure indicative of highest similarity; and, in response to a replacement link being specified by the user, updating the resources of the content management system with the replacement link, and executing the link analysis function with the link being the replacement link.

17. The method of claim 1, the content model further comprising information selected from the group of:
text, keywords, language, topics, inverted index, pictures, metadata, change history, dynamic nature, usage statistics, and/or structure of the target resource;
an identifier of a content management system or framework which was used to create the target resource;
an indicator for a logical location of the target resource relative to a target space comprising the target resource; and
a list of incoming links to the target resource.

18. A computer system for managing links to resources in a content management system, the content management system comprising a first link to a first target resource, the computer system comprising a processor and memory, the memory having stored program instructions therein, a first section of the program instructions being a link analysis function, the link analysis function being adapted, when executed by the processor, for causing the system to:
  receive a link to a target resource;
  determine a content model of the target resource based at least on content of the target resource, the content model comprising a fingerprint of the target resource; and
  store the content model,
a second section of the program instructions being adapted, when executed by the processor, for causing the system to:
  execute the link analysis function with the link being the first link, the execution resulting in the content model being a first target model of the first target resource;
  monitor the first target resource by repeating the execution of the link analysis function with the first link, the repeated execution resulting in the content model being a temporary first target model of the first target resource;
  detect a difference between the first target model and the temporary first target model by executing a fingerprint comparator function, the fingerprint comparator function being adapted for:
    receiving a first fingerprint of a first resource;
    receiving a second fingerprint of a second resource;
    receiving a specification of key variables eligible for the comparison, the specification comprising a grouping of the eligible key variables into data categories, each data category being associated with a predetermined weight factor;
    deriving, for each of the eligible key variables present in both the first fingerprint and the second fingerprint, a difference value from the value of the key variable in the first fingerprint and the value of the key variable in the second fingerprint; and
    combining the derived difference values into a comparison figure; and
  in response to detecting a difference between the first target model and the first temporary first target model, trigger an automatic response action, the response action comprising storing a change record, the change record comprising information indicative of the detected difference.

19. A computer program product for managing links to resources in a content management system, the content management system comprising a first link to a first target resource, the computer program product comprising a computer-readable storage medium, the computer-readable storage medium having embodied program instructions therewith, a first section of the program instructions being a link analysis function, the link analysis function being adapted, when executed by a processor of a computer system, for causing the computer system to:
  receive a link to a target resource;
  determine a content model of the target resource based at least on content of the target resource, the content model comprising a fingerprint of the target resource; and
  store the content model,
a second section of the program instructions being adapted, when executed by the processor, for causing the computer system to:
  execute the link analysis function with the link being the first link, the execution resulting in the content model being a first target model of the first target resource;
  monitor the first target resource by repeating the execution of the link analysis function with the first link, the repeated execution resulting in the content model being a temporary first target model of the first target resource;
  detect a difference between the first target model and the temporary first target model by executing a fingerprint comparator function, the fingerprint comparator function being adapted for:
    receiving a first fingerprint of a first resource;
    receiving a second fingerprint of a second resource;
    receiving a specification of key variables eligible for the comparison, the specification comprising a grouping of the eligible key variables into data categories, each data category being associated with a predetermined weight factor:
    deriving, for each of the eligible key variables present in both the first fingerprint and the second fingerprint, a difference value from the value of the key variable in the first fingerprint and the value of the key variable in the second fingerprint; and
    combining the derived difference values into a comparison figure; and
  in response to detecting a difference between the first target model and the first temporary first target model, trigger an automatic response action, the response action comprising storing a change record, the change record comprising information indicative of the detected difference.

* * * * *